United States Patent
Vanmeerbeeck et al.

(10) Patent No.: US 11,946,850 B2
(45) Date of Patent: Apr. 2, 2024

(54) DEVICE FOR DETECTING PARTICLES INCLUDING POLLEN IN AIR USING DIGITAL HOLOGRAPHIC RECONSTRUCTION

(71) Applicant: IMEC VZW, Leuven (BE)

(72) Inventors: Geert Vanmeerbeeck, Keerbergen (BE); Ziduo Lin, Heverlee (BE); Abdulkadir Yurt, Heverlee (BE); Richard Stahl, Rotselaar (BE); Andy Lambrechts, Herent (BE)

(73) Assignee: IMEC VZW, Leuven (BE)

( * ) Notice: Subject to any disclaimer, the term of this patent is extended or adjusted under 35 U.S.C. 154(b) by 139 days.

(21) Appl. No.: 17/127,980

(22) Filed: Dec. 18, 2020

(65) Prior Publication Data

US 2021/0190671 A1      Jun. 24, 2021

(30) Foreign Application Priority Data

Dec. 20, 2019   (EP) ..................................... 19218692

(51) Int. Cl.
*G01N 15/14* (2006.01)
*G01N 15/1434* (2024.01)
(Continued)

(52) U.S. Cl.
CPC ....... *G01N 15/1434* (2013.01); *G03H 1/0866* (2013.01); *G01N 15/06* (2013.01);
(Continued)

(58) Field of Classification Search
CPC ....... G01N 15/1434; G01N 2015/1454; G01N 2015/1486; G01N 1/2211; G01N 1/4077;
(Continued)

(56) References Cited

U.S. PATENT DOCUMENTS 9,028,758 B2   5/2015   Keinan et al.
9,052,255 B2   6/2015   Langlois et al.
(Continued)

FOREIGN PATENT DOCUMENTS

EP   2673618 A1   12/2013
EP   2673618 B1   4/2017
(Continued)

OTHER PUBLICATIONS

Yu Sung Cho, Development of an automated wet-cyclone system for rapid, continuous and enriched bioaerosol sampling and its application to real-time detection, Dec. 30, 2019, Elsevier, Sensors & Actuators: B. Chemical 284 (2019) 525-533 (Year: 2018).*

(Continued)

*Primary Examiner* — Michael P LaPage
(74) *Attorney, Agent, or Firm* — MOSER TABOADA

(57) ABSTRACT

A device for detecting particles in air; said device comprising:
  a receiver for receiving a flow of air comprising particles;
  a particle capturing arrangement configured to transfer the particles from the flow of air to a liquid for collection of a set of particles in the liquid;
  a flow channel configured to pass a flow of the liquid comprising the set of particles through the flow channel;
  a light source configured to illuminate the set of particles in the flow channel, such that an interference pattern is formed by interference between light being scattered by the set of particles and non-scattered light from the light source; and
  an image sensor comprising a plurality of photo-sensitive elements configured to detect incident light, the image sensor being configured to detect the interference pattern.

11 Claims, 3 Drawing Sheets

(51) Int. Cl.
*G03H 1/08* (2006.01)
*G01N 15/06* (2006.01)

(52) U.S. Cl.
CPC ............. *G01N 2015/1454* (2013.01); *G01N 2015/1486* (2013.01); *G03H 2001/0883* (2013.01)

(58) Field of Classification Search
CPC ....... G01N 2001/2223; G01N 15/1459; G01N 2015/0046; G01N 15/06; G01N 2015/0693; G01N 2035/00138; G03H 1/0866; G03H 2001/0883; G03H 1/0443
See application file for complete search history.

(56) References Cited

U.S. PATENT DOCUMENTS

| | | | |
|---|---|---|---|
| 10,222,363 | B2 | 3/2019 | Tamura |
| 11,073,461 | B2* | 7/2021 | Li ................... G03H 1/0443 |
| 2002/0018211 | A1 | 2/2002 | Megerle |
| 2009/0139399 | A1 | 6/2009 | Kang et al. |
| 2010/0035235 | A1* | 2/2010 | Gabriel ............. G01N 15/0211 435/7.1 |
| 2012/0148141 | A1* | 6/2012 | Ozcan ............... G01N 15/1434 382/133 |
| 2013/0242301 | A1* | 9/2013 | Berg ................. G01N 15/1434 356/336 |
| 2015/0099272 | A1 | 4/2015 | Hwang et al. |
| 2017/0153106 | A1 | 6/2017 | Ozcan et al. |
| 2017/0219998 | A1* | 8/2017 | Hong ................. G03H 1/0443 |
| 2017/0270388 | A1* | 9/2017 | Vercruysse ......... G06K 9/6267 |
| 2017/0363377 | A1* | 12/2017 | Phillips ................ B22F 12/90 |
| 2018/0080760 | A1* | 3/2018 | Allier ................ G06V 20/698 |
| 2018/0189963 | A1* | 7/2018 | Joly .................... G03H 1/0443 |
| 2019/0011882 | A1* | 1/2019 | Gusyatin ............... C12M 41/36 |
| 2019/0234853 | A1* | 8/2019 | Ruffner ............. G01N 15/0227 |
| 2019/0250559 | A1* | 8/2019 | Hamalainen ........ G01N 21/453 |
| 2020/0116617 | A1* | 4/2020 | Singh ................ G01N 15/147 |
| 2020/0340900 | A1* | 10/2020 | Brown ................ G01N 1/2273 |
| 2021/0294267 | A1* | 9/2021 | Constancias ......... G03H 1/0866 |
| 2022/0012850 | A1* | 1/2022 | Ozcan .................... G06N 3/045 |
| 2022/0066390 | A1* | 3/2022 | Gusyatin ............. G03H 1/0443 |
| 2022/0146402 | A1* | 5/2022 | Jobert ................. G02B 5/0825 |
| 2022/0206434 | A1* | 6/2022 | Ozcan ................ G03H 1/0866 |

FOREIGN PATENT DOCUMENTS

| | | |
|---|---|---|
| EP | 3502660 A1 | 6/2019 |
| JP | 2008500542 A | 1/2008 |
| WO | WO-2018/227193 A1 | 12/2018 |

OTHER PUBLICATIONS

Stachowiak et al., "Autonomous Microfluidic Sample Preparation System for Protein Profile-Based Detection of Aerosolized Bacterial Cells and Spores", Anal. Chem., 79, 15, 5763-5770, https://doi.org/10.1021/ac070567z, 2007.

Cui et al., "Lensless high-resolution on-chip optofluidic microscopes for Caenorhabditis elegans and cell imaging". PNAS, 105 (31) 10670-10675; https://doi.org/10.1073/pnas.0804612106, Aug. 5, 2008.

Kiselev et al., "A flash-lamp based device for fluorescence detection and identification of individual pollen grains", Review of Scientific Instruments 84, 033302; https://doi.org/10.1063/1_4793792, 2013.

Galán et al., "Pollen monitoring: minimum requirements and reproducibility of analysis". Aerobiologia 30, 385-395. https://doi.org/10.1007/310453-014-9335-5, Mar. 20, 2014.

Mirzaee et al., "A microfluidics-based on-chip impinger for airborne particle collection", Lab on a Chip, issue 12, 2254-2264, https:/doi.org/10.1039/C8LC00040A, 2016.

Crouzy et al., "All-optical automatic pollen identification: Towards an operational system", Atmospheric Environment, vol. 140, pp. 202-212, https://doi.org/10.1016/j.atmosenv.2016.05.082. Sep. 2016.

Park et al., "Continuous and real-time bioaerosol monitoring by combined aerosol-to-hydrosol sampling and ATP bioluminescence assay", Analytica Chimica Acta, vol. 941, pp. 101-107, https://doi.org/10.1016/.aca.2016.08.039, Oct. 19, 2016.

Choi et al., "A new method for the real-time quantification of airborne biological particles using a coupled inertial aerosol system with in situ fluorescence imaging", Sensors and Actuators B: Chemical, vol. 244, pp. 635-641, https://doi.org/10.1016/j.snb.2017.01.055, Jun. 2017.

Cho et al., "Development of an automated wet-cyclone system for rapid, continuous and enriched bioaerosol sampling and its application to real-time detection", Sensors and Actuators B: Chemical, vol. 284, pp. 525-533, https://doi.org/10.1016/j.snb.2018.12.155, Apr. 1, 2019.

Extended European Search Report for Application No. EP 19218692.2, search completion date May 25, 2020.

* cited by examiner

DEVICE FOR DETECTING PARTICLES INCLUDING POLLEN IN AIR USING DIGITAL HOLOGRAPHIC RECONSTRUCTION

CROSS-REFERENCE TO RELATED APPLICATION

The present application claims priority based on European Application No. 19218692.2, filed on Dec. 20, 2019, which is incorporated herein by reference.

TECHNICAL FIELD

The present inventive concept generally relates to detection of particles in air, and in particular to detection of pollen in air.

BACKGROUND

Interior and exterior air quality is of increasing interest globally. In some instances, monitoring exterior air quality of pollens or dust, or other pollutants is of great interest. Interior air quality, including the presence of molds, fungi, pollen, dust, or living organisms, such as bacteria, is also of growing interest. For example, allergic reactions to airborne pollen is an increasing problem. Therefore, pollen measurements are being carried out and reported, e.g. together with weather reports.

Pollen may be collected using e.g. Hirst samplers or Bertin Coriolis air samplers. Hirst samplers use an adhesive tape to capture pollen from the air while Bertin Coriolis air samplers transfer pollen to a liquid. In both cases the samples are then manually removed and analyzed, e.g. using standard optical microscopy.

Due to the way the information is obtained, and the manual efforts required to analyze measurements, there is currently a significant delay in acquiring pollen information. Moreover, the number of measurement locations is limited due to the high cost of pollen measurement equipment.

Having technology to drastically increase the amount of compact pollens measurement stations at a low cost but with the ability to execute fully automated measurements at a higher frequency (e.g. several times per day) would have the potential of providing more up-to-date and geographically more precise information on pollen levels in the air. This information would be valuable to people that are affected by pollen allergies, as it could be used on a much more local scale and specific for every individual as an indicator to reduce the consumption of antihistamine and thereby reducing the side-effects of these drugs, such as sedation, drowsiness, and insomnia.

Automated aerosol particle detectors have been developed, as reviewed by Kiselev et al. [Review of Scientific Instruments 84, 033302 (2013)]. Such particle detectors suck in ambient air, including aerosols, and expel the air through a special nozzle. Various light sources are focused at the nozzle outlet. As an aerosol in the flow passes the focal point of the light, it is recognized by the concomitant scattering detected by two photomultiplier tubes equipped with tailored bandpass filters. In addition to light scattering detection, the automated aerosol particle detectors may furthermore detect a fluorescence signal. Although present automated aerosol particle detectors are fully functional, there is still room for improvement.

In terms of monitoring interior air quality with respect to bacteria, for example, the current art requires physical sample collection of a collection device (i.e. Petri dish with a media conducive to bacterial growth) that is placed in an environment and exposed for a given time duration, collected and viewed under a lens (microscope) using standard optical microscopy by a skilled technician, for example.

SUMMARY

It is an objective of the invention to provide an automated device for detecting particles in air. It is a further objective to facilitate that particles may be determined as particles of interest (e.g. pollen or bacteria). It is a further objective of the invention that the device is accurate, robust, and inexpensive. The device is hereinafter primarily described as a device for detecting pollen in air. However, it should be understood that the device may also be used for detecting other types of particles, e.g. mold, fungi, bacteria, dust, dirt, soot, or smoke.

These and other objectives of the invention are at least partly met by the invention as defined in the independent claims. Preferred embodiments are set out in the dependent claims.

According to a first aspect of the invention, there is provided a device for detecting particles in air; said device comprising:
- a receiver for receiving a flow of air comprising particles;
- a particle capturing arrangement configured to transfer the particles from the flow of air to a liquid for collection of a set of particles in the liquid;
- a flow channel configured to pass a flow of the liquid comprising the set of particles through the flow channel;
- a light source configured to illuminate the set of particles in the flow channel, such that an interference pattern is formed by interference between light being scattered by the set of particles and non-scattered light from the light source; and
- an image sensor comprising a plurality of photo-sensitive elements configured to detect incident light, the image sensor being configured to detect the interference pattern.

It is a realization of the invention that an image sensor facilitates imaging based on light scattering from a particle, in contrast to merely detecting the existence and/or magnitude of light scattering from a particle. A device according to the inventive concept may therefore have several advantages over automated aerosol particle detectors such as the ones disclosed by Kiselev et al.

Detecting particles using an image sensor may make it possible to differentiate between different types of particles according to their morphology. For example, if the objective is to measure pollen in air, pollen may be differentiated from soot particles by the particle shape. False positive results may thereby be avoided. Imaging may be a more effective and inexpensive way to differentiate between particle types than e.g. fluorescence spectroscopy. It may even be possible to differentiate between very similar particles, e.g. differentiating different types of pollen from each other.

Detecting particles using an image sensor which detects particles in a passing flow may make the detection accurate as the image sensor may detect particles in a large volume of a passing flow. In contrast, if the particle signal is picked up from a single focal point of a passing flow, a smaller volume may be investigated which may result in larger statistical error margins.

It is a further realization of the invention that forming an interference pattern by interference between light being scattered by the set of particles and non-scattered light, and subsequently detecting said interference pattern with an image sensor, may facilitate several advantages over conventional imaging/microscopy devices. A device according to the inventive concept may e.g. work according to the principles of digital holographic imaging.

The non-scattered light from the light source may be passed along a common optical path with the light being scattered by the particles. Thus, the interference pattern may be formed within a wavefront passing the particles and the particle sample carrier in a so-called in-line holography set-up. However, according to an alternative, the non-scattered light may be passed along a separate reference light path, which is combined with the light having been scattered by the particles for reaching the image sensor. In such case, the image sensor may be configured to detect light being reflected by the particles or light being transmitted through the particle sample carrier on which the particles are collected.

A device according to the inventive concept may be accurate. The interference pattern detected by the image sensor may be converted to an image and the image may reveal the morphology of the particle. Furthermore, a device according to the inventive concept may measure a larger volume of a passing flow than a conventional imaging/microscopy device. As mentioned, a larger measured volume may result in a higher statistical accuracy. The device may have a large field of view. For example, digital holographic imaging devices may have a larger field of view than conventional imaging/microscopy devices. A large field of view may mean that a large lateral extension of the flow channel may be measured. The device may also have a large depth of focus. For example, digital holographic imaging devices may have a larger depth of focus than conventional imaging/microscopy devices. A large depth of focus may mean that a deeper flow channel may be measured.

A device according to the inventive concept may be inexpensive. As the device may be implemented according to the principles of digital holographic imaging either no lenses, fewer lenses, or less expensive lenses may be needed in comparison to conventional imaging/microscopy devices. A high-quality lens or collection of lenses, e.g. a microscope objective, may be very costly.

A device according to the inventive concept may be compact. As the device may be implemented according to the principles of digital holographic imaging it may be more compact than conventional imaging/microscopy devices. Using lenses for projecting an image on an image sensor may require a lot of space, especially if a large field of view is required.

A device according to the inventive concept may be robust. If conventional microscopy imaging had been implemented in an automated device in the field it would most likely be very sensitive. For example, due to the small depth of focus, a microscope objective would most likely be sensitive to perturbations moving the focal point, e.g. due to temperature fluctuations or knocks to the device. In contrast, a device according to the inventive concept may be less sensitive to such perturbations.

It is a further realization of the invention that transferring the particles from the flow of air to a liquid may make the particles convenient to handle in an automated device, such that they may easily be presented to the image sensor for detection. The particles may stay suspended in a liquid more readily than in air, even at a low flow rate and in narrow flow channels. Thus, the percentage of particles precipitating on the side walls of a flow channel may be smaller if the flow channel passes a liquid carrying the particles than if the flow channel passes air carrying the particles. Furthermore, in the transfer from air to liquid the particle concentration may be increased. For example, by transferring the particles of a large volume of air to a small volume of liquid. A small volume of liquid may then be passed by the image sensor at low speed while representing a large volume of air passing by the image sensor at high speed. Detecting slow moving particles may be easier than detecting fast moving particles.

It is a realization of the invention that imaging particles in a flow, wherein the particles have a concentration corresponding to the concentration of particles in air, may be very difficult. With conventional imaging/microscopy techniques it may be almost impossible due to above mentioned limitations. Forming an interference pattern by interference between light being scattered by the set of particles and non-scattered light, and subsequently detecting said interference pattern with an image sensor may relieve some of the difficulties. However, accurate detection may still be very challenging as most of the measured volume of the flow may be empty. Having the possibility of increasing the concentration in the flow may be advantageous when low concentrations need to be measured.

It should be understood that the "particles" referred to in the present disclosure may be pollen, but may also be any other type of air-borne particulate matter such as soot, air-borne bacteria, or fungi. Furthermore, the set of particles collected in the liquid may be all particles from the flow of air or a subset of the particles from the flow of air.

By the term "receiver" is here meant any unit, device, or element arranged to allow a flow of air from to pass through it, such that a portion of ambient air may flow into the device. By way of example, a receiver may be, but is not limited to, a funnel or an entrance to a flow channel.

It should be understood that the particle capturing arrangement may be an arrangement through which a continuous flow of air and a continuous flow of liquid passes. The air may leave the particle capturing arrangement with a lower particle concentration than when it entered. The liquid may leave the particle capturing arrangement with a higher particle concentration than when it entered. Thus, particles may be transferred from the air to the liquid. The volumetric flow rate through the particle capturing arrangement may be lower for the liquid than for the air. Thus, the particle concentration may increase for the transferred particles when they are transferred to the liquid. The liquid may leave the particle capturing arrangement through the flow channel configured to pass a flow of the liquid.

It should also be understood that the particle capturing arrangement may be an arrangement which transfers particles from a flow of air to a stationary volume of liquid. Herein the volume of liquid may enter the particle capturing arrangement, remain in the particle capturing arrangement for some time during the transfer of particles, and then leave the particle capturing arrangement. The liquid may leave the particle capturing arrangement with a higher particle concentration than when it entered due to particles being transferred from the air to the liquid. The particle concentration in the liquid leaving the particle capturing arrangement may be higher than the particle concentration in the flow of air entering the particle capturing arrangement. Thus, the particle concentration may increase for the transferred particles when they are transferred to the liquid. The increase may e.g. depend on how much air passes the particle capturing arrangement during the time the liquid remains there. The liquid may leave the particle capturing arrangement through the flow channel configured to pass a flow of the liquid.

It should be understood that the liquid may be water. Using water may be advantageous as water often is readily accessible on tap. The liquid may also be a liquid specially configured for the device or for the particles that should be collected. For biological particles the liquid may e.g. be a buffered solution with a pH suitable for the biological particles. For a device which uses a particle capturing arrangement which agitates the liquid, e.g. a cyclone, the liquid may e.g. contain an antifoam agent. The liquid may also be processed to ensure that the liquid entering the particle capturing arrangement is free from particles that may affect detection of particles of interest.

It should be understood that the light source may be configured to emit pulsed light. An advantage of using pulsed light may be that motion blur due to object movement during image acquisition may be avoided. Alternatively, the light source may be configured to emit continuous light. It should be understood that the light may be light within the visible range or outside the visible range.

By the term "image sensor" is here meant any light sensor with a plurality of photo-sensitive elements, each configured to detect incident light. Given only as examples, the image sensor may be, but is by no means limited to, a charge-coupled device (CCD) or a complementary metal-oxide-semiconductor (CMOS) image sensor. It should also be understood that the image sensor may be configured to detect a time series of changing interference patterns of the set of particles in the flow channel, e.g. as particles passes the image sensor.

The particle capturing arrangement may be configured such that, in the particle capturing arrangement, particles are transferred from the flow of air to the liquid by a gravitational force.

Using gravity may be a simple method to transfer particles from the flow of air to the liquid. The flow of air may e.g. pass over a liquid surface while the set of particles precipitate out of the flow of air into the liquid.

Alternatively or additionally, the particle capturing arrangement may comprise a cyclone, the cyclone comprising:
  a spinner configured to impose a rotational motion on the flow of air to separate the particles from the flow of air through centrifugal action; and
  a collector configured to transfer the separated particles to the liquid.

A cyclone may effectively and quickly transfer particles from a flow of air to a liquid. A rotating flow of air may be established by the spinner. The spinner may be a structural feature forcing the flow of air to take a rotational path, thereby imposing a rotational motion on the flow of air. For example, the spinner may be a chamber in the form of a cylinder or cone, wherein the flow of air may be expelled tangentially along the inner side wall of the cylinder/cone such that the flow of air is forced to follow the curvature of the inner side wall.

The particles may be separated from the rotating flow of air by centrifugal action. As the flow of air rotates tangentially along the inner side wall of the cylinder or cone the particles may be centrifugally spun towards the inner side wall, hit it, and subsequently fall towards the bottom of the cylinder/cone. At the bottom a collector may transfer the separated particles to the liquid, thereby forming the set of particles in the liquid. The collector may be a liquid reservoir into which the set of particles fall.

It should be understood that the spinner may not necessarily be a structural feature. The spinner may also be a fan, a centrifugal blower or a similar device which applies a force to the flow of air, the force imposing a rotational motion.

It should also be understood that the particles do not necessarily need to fall into the collector. The collector may e.g. be a liquid film rotating along the inner side walls of the cylinder/cone. The particles may herein be centrifugally spun outwards and forced to pass the air/liquid interface and enter the liquid film, thereby forming the set of particles in the liquid.

Once the particles have been transferred to the liquid they may be transported by a flow of the liquid, through a flow channel, to the image sensor. The particles may subsequently be illuminated by the light source, such that an interference pattern is formed by interference between light being scattered by the set of particles and non-scattered light from the light source.

The light source may be configured to emit at least partially coherent light. Coherent light may be advantageous as it improves the interference visibility. A coherent light source may be a laser. However, it should be understood that also partially coherent light may provide an interference pattern with sufficient visibility. A partially coherent light source may e.g. be a light emitting diode emitting light directly onto the flow channel or through a pinhole onto the flow channel. A coherent light source may provide better interference visibility but be more expensive while a partially coherent light source may provide a worse interference visibility but be less expensive.

The device may further be configured such that:

- the light source is arranged outside a first side wall of the flow channel;
- the image sensor is arranged outside a second side wall of the flow channel; and
- the flow channel is configured to provide a light path from the light source to the image sensor through the first side wall of the flow channel, through the flow of liquid in the flow channel, and through the second side wall.

Such a configuration may be advantageous as it permits in-line holographic imaging. In-line holographic imaging may have the advantages previously mentioned in conjunction with holographic imaging. In-line holographic imaging may be particularly useful for imaging samples which are mainly transparent such as e.g. a flow carrying a dilute set of particles. In-line holographic imaging may provide a compact measuring setup compared to other holographic imaging measuring setups as the object light, i.e. the light being scattered by the set of particles, and the reference light, i.e. the non-scattered light from the light source, may share a common optical axis, i.e. the light path through the flow of liquid in the flow channel.

It should be understood that the first and second side wall of the flow channel may be transparent or partially transparent, at least at a wavelength of the light source. It should also be understood that the flow of liquid in the flow channel may be transparent or partially transparent, at least at a wavelength of the light source.

It should be understood that the signal to noise ratio, SNR, of the detected interference pattern may decrease with increasing distance between the image sensor and the scattering particle. Thus, it may be advantageous if a distance between an inner surface of the first side wall of the flow channel and the image sensor is below a distance threshold, wherein the distance is a distance along the light path. The distance threshold may thus define the maximum length of the light path between a particle in the flow channel and the image sensor. The distance threshold may depend on the acceptable SNR. For example, if the objective is to detect any particle without differentiating between types of particles a lower SNR and a higher distance threshold may be acceptable. If the objective is to differentiate between types of particles, a higher SNR and a lower distance threshold may be necessary. If the objective is to differentiate between very similar particles a yet higher SNR and a yet lower distance threshold may be necessary. Examples of distance thresholds that are useful for various objectives are: 40 mm, 20 mm, 10 mm, and 5 mm.

In order to utilize as much as possible of the space between the image sensor and the distance threshold it may be advantageous for the image sensor to be placed at a distance of less than 5 mm from the inner surface of the second side wall of the flow channel. In another embodiment it may be advantageous for the image sensor to be placed at a distance of less than 2 mm from the inner surface of the second side wall of the flow channel.

The flow channel may be a flow channel in between the light source and the imaging sensor, wherein the depth of the flow channel is below the distance threshold, the depth herein referring to the extension of the flow channel in a direction defined by the direction of the light path. The flow channel may further have a width larger than the depth, the width herein referring to an extension orthogonal to the direction of the light path. It may be advantageous, although not necessary, to have a flow channel arranged such that the direction of the of the flow is essentially orthogonal to the optical axis of the illuminating light. It may be advantageous to have a light source emitting collimated light, the light may herein be an expanded and collimated laser beam. However, a diverging light beam, e.g. from a light emitting diode, may also be used.

In some embodiments the flow channel may be a microfluidic flow channel. A microfluidic flow channel may be a flow channel with a depth smaller than e.g. 500 micrometers, or smaller than 200 micrometers. A microfluidic flow channel may ensure a high SNR for the detected interference pattern. A microfluidic flow channel may also ensure a laminar flow.

The device may further be configured to define a particle concentration relation, defining a relation between the concentration of the set of particles in the liquid and the concentration of particles in the flow of air.

The relation between the concentration of the set of particles in the liquid and the concentration of particles in the flow of air may e.g. be defined by the particle capturing arrangement. However, it may also be defined in another part of the device. When the relation between the concentration of the set of particles in the liquid and the concentration of particles in the flow of air is defined it may be possible to calculate the concentration of particles in the flow of air from a measured concentration of the set of particles in the liquid. The device may have a fixed particle concentration relation which is defined when the device is manufactured. The device may also define a particle concentration relation dynamically, e.g. from one measurement to another. For example, if the measured concentration of the set of particles in the liquid is low, e.g. close to a resolution limit of the measurement, the particle concentration relation may be changed. Thus, even though the concentration of particles in the flow of air may be unchanged the concentration of the set of particles in the liquid may be increased by changing the particle concentration relation. Changing the particle concentration relation dynamically may e.g. be done by changing a ratio between the volumetric flow rate of air and liquid through the particle capturing arrangement. The particle concentration relation may be a ratio between the concentration of the set of particles in the liquid and the concentration of particles in the flow of air. The device may be configured to define the ratio above a threshold during operation. Alternatively, the device may be configured at manufacturing to ensure a ratio above a threshold when the device is in operation. The threshold may herein depend on the application. The threshold may e.g. be 1, 100, or 1000.

The device may further comprising a filter, the filter being arranged in a flow path of the flow of the liquid downstream the flow channel such that the filter is configured to capture the set of particles collected in the liquid and thereby remove the set of particles from the flow of the liquid.

Thus, the liquid may be re-used after passing the image sensor. It may either be re-used for collecting a new set of particles or for other purposes. If the particles are hazardous it may be advantageous to filter them out before the liquid enters the environment.

The device may further comprise a return conduit connecting an output of the filter with the particle capturing arrangement allowing the liquid passing through the filter to return to the particle capturing arrangement, enabling re-use of the liquid for collection of a subsequent set of particles.

Thus, the liquid may be re-used for collecting a new set of particles. The device may thereby not need a supply of fresh liquid. The device may e.g. not need to be connected to a water pipe. Furthermore, specially configured liquids may be used, such as buffered solutions or antifoam treated liquids, which may enhance the performance of the device. Specially configured liquids may not be accessible on tap and without re-use of the liquid the device may need manual refills on a regular basis. If re-use of the liquid is not needed a return conduit may not be necessary and the liquid may just go to a waste outlet, with or without filtering.

The device may further comprise a processor configured to perform digital holographic reconstruction on the interference pattern detected by the image sensor to generate an image of the set of particles.

The processor may be arranged internally in the device. Alternatively, the processor may be arranged in an external unit, such that the digital holographic reconstruction may take place elsewhere. Data of the interference patterns detected by the image sensor may be transferred to the processor, either by a wired connection or wirelessly.

It should be understood that when referring to an "image" in the present disclosure, not merely a two-dimensional projection of a three-dimensional object is intended. Rather, it should be seen from a wider point of view in which a holographic reconstruction, being a three-dimensional representation of an object, in this case particles, is also regarded as an image. Further, within the field of digital image processing it is understood by a person skilled in the art that an "image" undergoing processing in e.g. a computer, is not necessarily the visually available representation of the image displayed on screen, but rather it may be the digital representation of the image inside the processor that is being processed. In fact, there is no requirement of providing any display of the image on screen for the processor to be able to carry out the processing of the image. On the contrary, when a processor performs processing of a large amount of images, it is likely to do so without displaying the images on screen. Hence in the present disclosure, included in the term "image" is not only two-dimensional and three-dimensional visually available images, but also digital representations of images inside the processor or a computer memory.

The device may further be configured to:
compare the image of the set of particles to one or more characteristics of particles to identify particles in the image.

Thus, the device may be configured to automatically identify particles in the image such that the device may also count the particles.

The device may further be configured to calculate a concentration of particles in the received flow of air based on a counted number of identified particles in the image of the set of particles and the defined particle concentration relation.

By calculating a concentration of particles, it is possible e.g. to automatically provide concentration of pollen in air so as to provide frequent results of pollen concentration.

It should be understood that determining particle concentration may be done by processing a single image, or a plurality of images.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
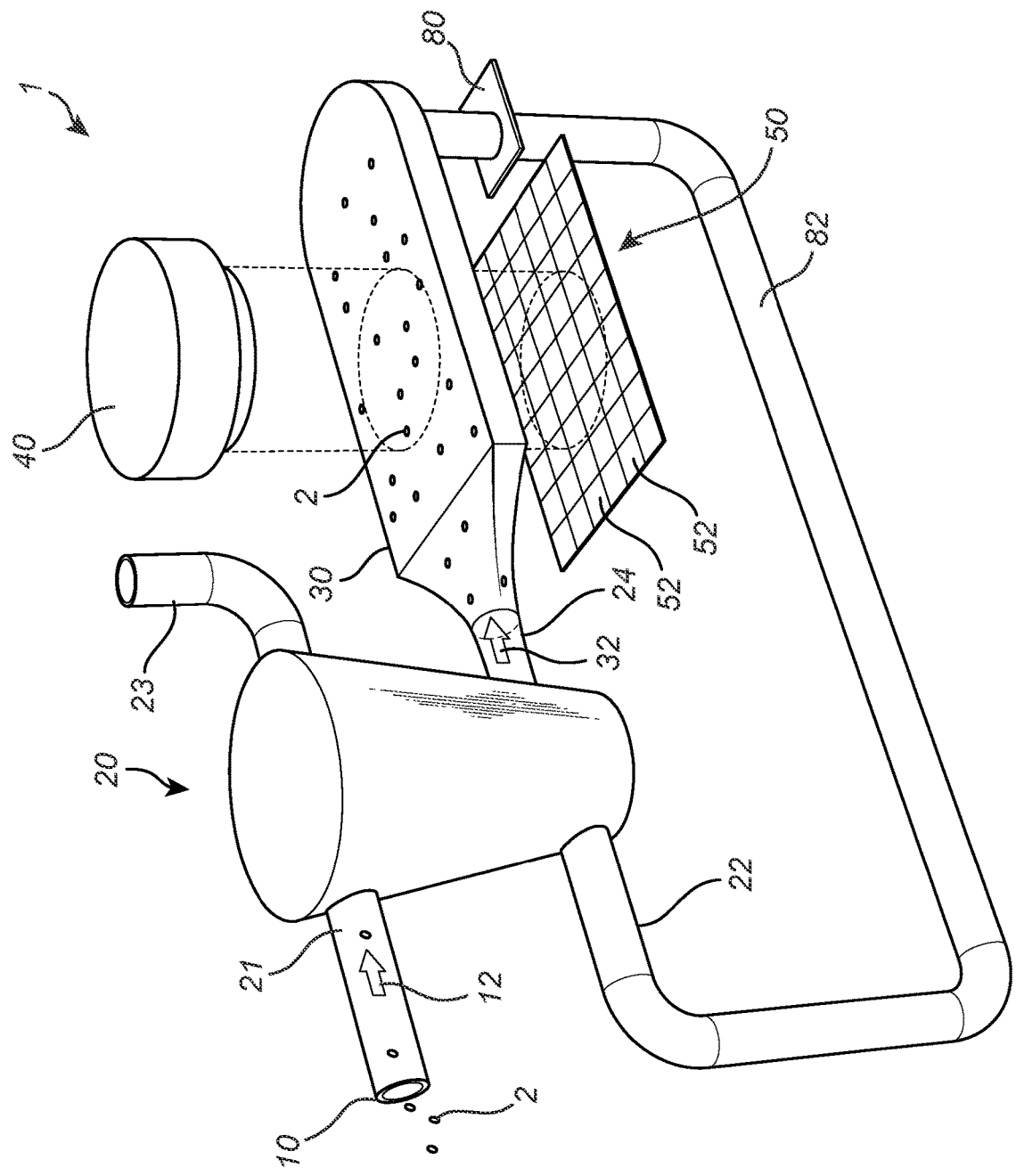
FIG. 1 is a device for detecting particles in air.

FIG. 1 illustrates a device 1 for detecting particles in air. The device 1 comprises a receiver 10 for receiving a flow of air 12, wherein the flow of air 12 contains particles 2. The flow of air 12 enters a particle capturing arrangement 20 via an air inlet 21. In the illustrated embodiment the particle capturing arrangement 20 further comprises a liquid inlet 22, an air outlet 23 and a liquid outlet 24. In addition to receiving air, the illustrated particle capturing arrangement 20 receives liquid via the liquid inlet 22. The particle capturing arrangement 20 then separates at least part of the particles 2 from the flow of air 12 and transfers them to the liquid. The liquid, with the transferred particles 2, subsequently leaves the particle capturing arrangement 20 via the liquid outlet 24 as a flow of liquid 32 comprising a set of particles 2. The set of particles 2 may herein be all the particles 2 from the flow of air 12 or a subset of the particles 2 from the flow of air 12. The air may leave the particle capturing arrangement 20 via the air outlet 23. The air from the air outlet 23 may comprise particles 2 that were not transferred to the liquid. The concentration of the set of particles 2 in the flow of liquid 32 may or may not be higher than the concentration of the particles 2 in the flow of air 12.

The flow of liquid 32 from the particle capturing arrangement 20 then enters a flow channel 30. A light source 40 is configured to illuminate the set of particles 2 as they pass through the flow channel 30. As the particles 2 are illuminated an interference pattern is formed on an image sensor 50, wherein the interference pattern is formed by interference between light being scattered by the set of particles and non-scattered light from the light source 40. The image sensor 50 comprises a plurality of photo-sensitive elements 52 configured to detect incident light. The image sensor 50 may herein be a CCD or CMOS camera.

In the illustrated device 1, a filter 80 is arranged in the flow path of the flow of liquid 32 downstream the flow channel 30 such that the filter 80 captures the set of particles 2 in the flow of liquid. The illustrated device 1 further comprises a return conduit 82 connecting an output of the filter 80 with the particle capturing arrangement 20. In this case, the return conduit 82 is connected to the liquid inlet 22 of the particle capturing arrangement 20. Thus, liquid that has passed through the filter 80 may return to the particle capturing arrangement 20 and be re-used.

The different parts of the device 1 will hereinafter be described in more detail in conjunction with FIGS. 2 and 3.

Figure 2:
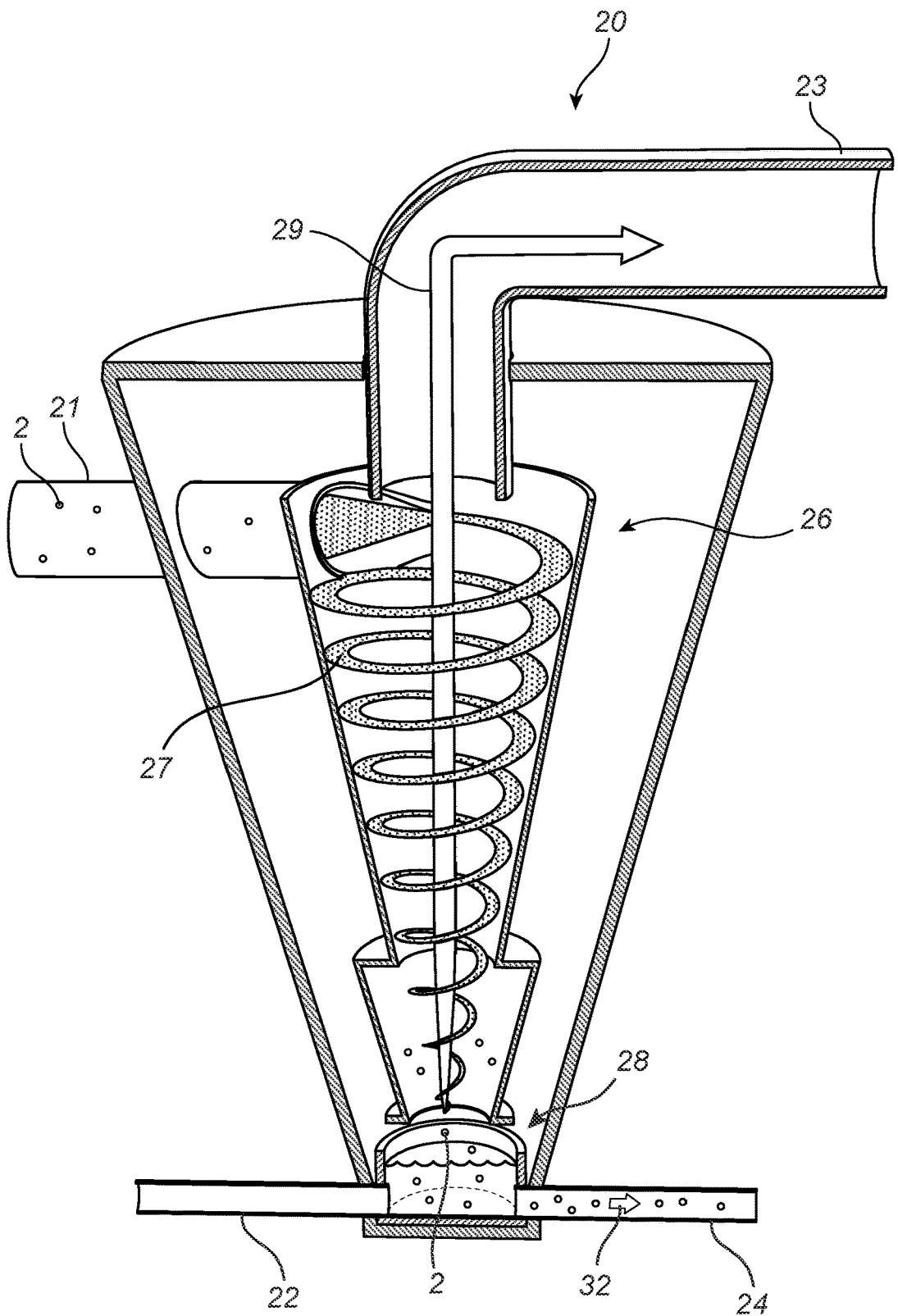
FIG. 2 is a particle capturing arrangement.

FIG. 2 illustrates a particle capturing arrangement 20 in the form of a cyclone. The illustrated cyclone receives a flow of air 12 comprising particles 2 via the air inlet 21. The air is subsequently led to a spinner 26 in the form of a chamber with a conical shape. The air then enters the chamber along a tangent of the inner side wall. By following the side walls of the conically shaped chamber the flow of air 12 forms a rotating flow of air 27 which in the illustrated cyclone follows the helical path of a descending vortex towards the narrow end of the chamber. Part of the particles 2 are spun out towards the side walls of the chamber through centrifugal action and fall into a collector 28. In the illustrated cyclone the flow of air 12 subsequently continues as an exit flow 29 from the narrow end of the chamber towards the air outlet 23. The flow of air 12 now comprises less or no particles 2. The particles 2 falling into the collector 28 may fall into a reservoir through which the flow of liquid 32 passes and thus be transferred to the liquid. The flow of liquid 32 with the transferred particles 2 may then continue through the liquid outlet 24 and on to the flow channel 30.

In the illustrated cyclone a particle concentration relation between the concentration of particles in the flow of air 12 entering the air inlet 21 and the concentration of particles in the flow of liquid 32 exiting the liquid outlet 24 may be set by the efficiency of the particle transfer, the volumetric flow rate of the air and the volumetric flow rate of the liquid.

Figure 3:
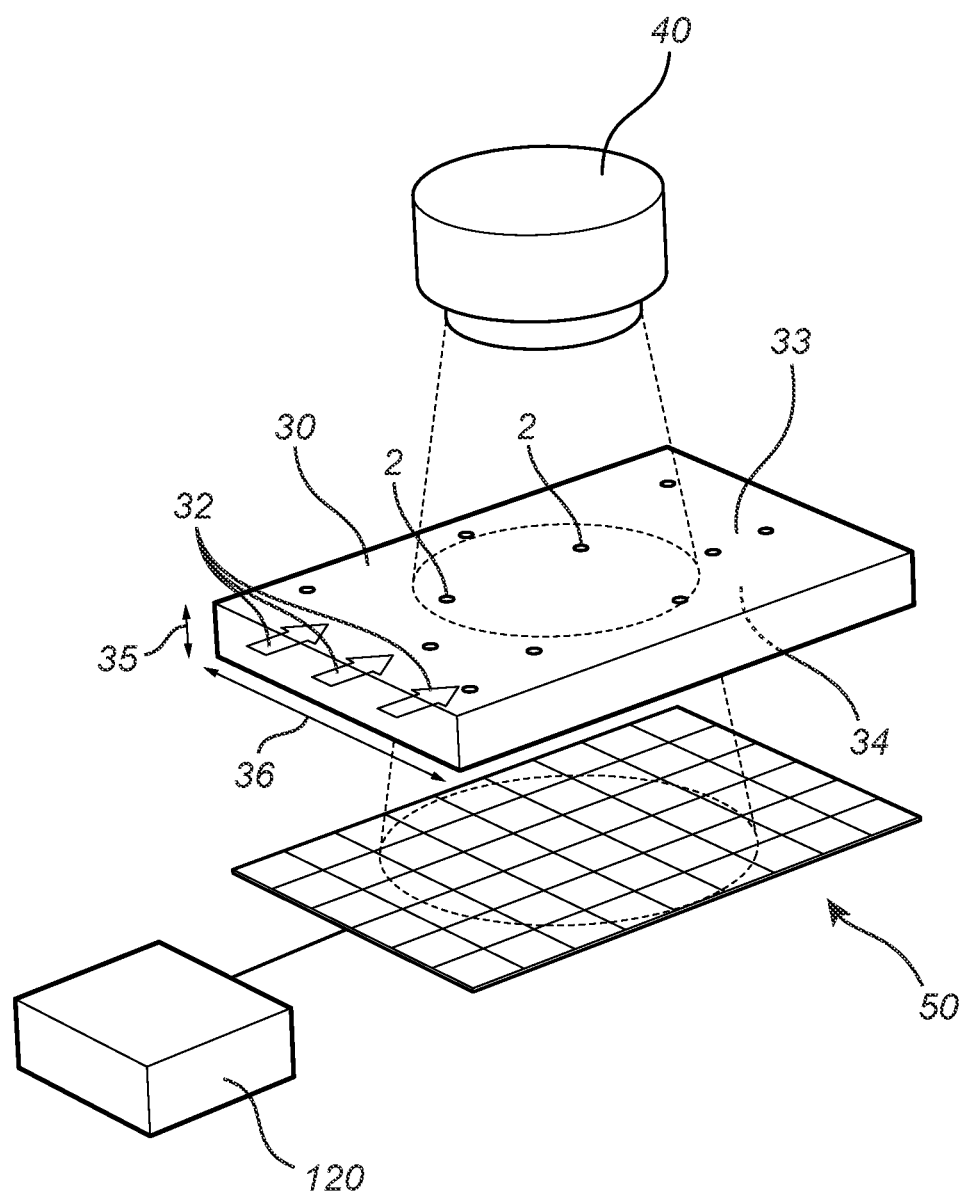
FIG. 3 is part of a device for detecting particles in air.

FIG. 3 illustrates the flow channel 30, the light source 40 and the image sensor 50 of the device 1. The light source 40 is herein arranged outside a first side wall 33 of the flow channel 30 and the image sensor 50 is arranged outside a second side wall 34 of the flow channel. The flow channel 30 is configured to provide a light path from the light source 40 to the image sensor 50 through the first side wall 33 of the flow channel 30, through the flow of liquid 32 in the flow channel 30, and through the second side wall 34. This may be accomplished e.g. using transparent first 33 and second 34 side walls.

The light from the light source 40 going through the flow channel 30 forms an interference pattern on the imaging sensor 50. The interference pattern is herein formed by interference between light being scattered by the set of particles 2 in the flow of liquid 32 in the flow channel 30 and light from the light source 40 that has passed the flow channel 30 without being scattered by any particles 2.

In FIG. 3 the image sensor 50 is connected to a processor 120 configured to perform digital holographic reconstruction on the interference pattern detected by the image sensor 50 to generate an image of the set of particles 2. Any suitable algorithm for performing the digital holographic reconstruction may be used, as known to the person skilled in the art, including a Gerchberg-Saxton algorithm or multi-acquisition (multi-depth and/or multi-wavelength) for phase retrieval, or reconstruction based on angular spectrum diffraction by means of Gabor wavelet transform. The processor 120, or another processor, may then identify particles 2 in the image and subsequently count the identified particles 2.

The processor 120 may be implemented as a processing unit, such as a central processing unit (CPU), which may execute the instructions of one or more computer programs in order to implement functionality of the processor 120.

The processor 120 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the processor 120.

A concentration of particles 2 in the flow of liquid 32 may be calculated from the counted number of particles 2 in the image and the volume of liquid in the flow channel 30 that the image sensor 50 covers. However, a concentration of particles in the flow of liquid 32 may be calculated from the counted number of particles 2 in a plurality of images and the volume of liquid in the flow channel 30 that the plurality of images covers. When the concentration of particles in the flow of liquid 32 is low, several images may be needed to achieve a statistically accurate result.

The concentration of particles 2 in the flow of liquid 32 may subsequently be used to determine a concentration of particles 2 in the flow of air 12, corresponding to the concentration in the air at the receiver 10 of the device 1. The concentration of particles 2 in the flow of air 12 may be calculated based on the concentration of particles 2 in the flow of liquid 32 and the particle concentration relation.

As the SNR of the detected interference pattern may decrease with increasing distance between the image sensor and the scattering particle 2, it may be advantageous if the distance between the inner surface of the first side wall 33 of the flow channel 30 and the image sensor 50 is below a distance threshold. It should therefore be understood that it may be advantageous with a flow channel 30 close to the image sensor 50, e.g. in immediate proximity of the image sensor. It should be understood that in this respect FIG. 1 and FIG. 3 should be interpreted as schematic illustrations, wherein the flow channel 30 is illustrated some distance away from the image sensor 50 for the sake of clarity. In order to provide a short distance between the image sensor 50 and the scattering particles 2 while at the same time imaging a reasonably large volume of liquid, it may be advantageous with a flow channel 30 that has a larger channel width 36 than the channel depth 35. FIG. 3 illustrates such a channel.

The embodiments of the inventive concept presented above may be applied for a number of different purposes aiming at monitoring particles in interior and exterior air. The particles may be any type of air-borne particulate matter such as pollen, dust, soot, air-borne bacteria, or fungi. There is provided a device for detecting particles in air. The device may further be configured to determine if the collected particles are particles of interest. The concept allows a high measurement frequency and has a potential of performing automated measurements. Further, it may be capable of classifying or determining the type of particle collected.

Outdoor applications may be monitoring of exterior air quality for detection of pollen, dust, soot, or other pollutants.

According to an embodiment, a device for detecting pollen in air is provided. Thanks to the present inventive concept, pollen levels in exterior air may be monitored with a high frequency, and with the potential of performing automated measurements. It may also provide measurement stations at a low cost, which may lead to an increased number of measurement stations. This in turn may have the potential of providing more up-to-date and geographically more precise information on pollen levels in exterior air, which may be valuable to people that are affected by pollen allergies.

Indoor applications may be monitoring interior air quality for detection of molds, fungi, pollen, dust, or bacteria. Such monitoring can be applied in a variety of locations, such as public shopping malls, hospitals or laboratories.

Monitoring of air-borne bacteria may be of particular importance in aseptic environments, such as the manufacturing environment for pharmaceutical production. Monitoring of air-borne bacteria in interior air may be required to ensure a sterile manufacturing environment.

Presence of bacteria in the manufacturing environment of pharmaceutical products may contaminate the products and force the products manufactured in a contaminated environment to be disposed. Thus, early detection of presence of bacteria may be highly advantageous, because if production in a contaminated environment is continued, a large quantity of products may have to go to waste.

According to an embodiment, a device for detecting bacteria in air is provided. Thanks to the present inventive concept, bacterial levels in interior air may be monitored with a high frequency, and with the potential of providing results in real-time. As soon as bacterial levels are detected, the production may be stopped such that no or very little of the pharmaceutical products will go to waste.

Moreover, the real-time aspect of the present inventive concept further allows for monitoring of development of bacterial levels over time, by acquiring time sequences of measurements. In this manner bacterial growth may be studied.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for detecting particles in air; said device comprising:
 a receiver for receiving a flow of air comprising particles;
 a particle capturing arrangement comprising a particle separator for separating particles from the flow of air and a particle collector for collecting the separated particles, the particle collector being in communication with a flow of a liquid that receives the collected particles;
 a flow channel configured to pass the flow of the liquid comprising the particles through the flow channel;
 a light source for forming an interference pattern of the particles, the light source being configured to illuminate the particles in the flow of the liquid in the flow channel and form an interference pattern by interference between light being scattered by the particles in the flow of the liquid and non-scattered light from the light source;

an image sensor comprising a plurality of photo-sensitive elements configured to detect incident light, the image sensor being configured to detect the interference pattern of the particles in the flow of the liquid without the interference pattern passing a microscope objective; and one or more processors configured to:
perform digital holographic reconstruction on the interference pattern detected by the image sensor to generate an image of the particles, wherein the particle capturing arrangement is configured to set a particle concentration in the liquid such that the image is a digital holographic reconstruction of two or more particles; and identify particles of pollen in the digital holographic reconstruction of two or more particles by comparing the digital holographic reconstruction of two or more particles to one or more particle morphology of pollen.

2. The device according to claim 1, wherein, the particle capturing arrangement is configured such that, in the particle capturing arrangement, the particles are transferred from the flow of air to the liquid by a gravitational force.

3. The device according to claim 1, wherein the particle capturing arrangement is a cyclone,
and wherein the separator includes a spinner configured to impose a rotational motion on the flow of air to separate the particles from the flow of air through centrifugal action.

4. The device according to claim 1, wherein the light source is configured to emit at least partially coherent light.

5. The device according to claim 1, wherein:
the light source is arranged outside a first side wall of the flow channel;
the image sensor is arranged outside a second side wall of the flow channel; and
the flow channel is configured to provide a light path from the light source to the image sensor through the first side wall of the flow channel, through the flow of the liquid in the flow channel, and through the second side wall.

6. The device according to claim 1, wherein the flow channel is a microfluidic flow channel.

7. The device according to claim 1, wherein the device is further configured to define a particle concentration relation, defining a relation between the concentration of the particles in the liquid and the concentration of particles in the flow of air.

8. The device according to claim 1, further comprising a filter, the filter being arranged in a flow path of the flow of the liquid downstream the flow channel such that the filter is configured to capture the particles collected in the liquid and thereby remove the particles from the flow of the liquid.

9. The device according to claim 8, further comprising a return conduit connecting an output of the filter with the particle capturing arrangement allowing the liquid passing through the filter to return to the particle capturing arrangement, enabling re-use of the liquid for collection of a subsequent set of particles.

10. The device according to claim 1, wherein the particle capturing arrangement is further configured to define a particle concentration relation, defining a relation between the concentration of the particles in the liquid and the concentration of particles in the flow of air, and wherein the at least one of the one or more processors is further configured to calculate a concentration of particles in the received flow of air based on a counted number of identified particles in the image of the particles and the defined particle concentration relation.

11. The device according to claim 1, wherein the light source is configured to illuminate the particles in the flow of the liquid with pulsed light.

* * * * *